United States Patent
Ligman et al.

(10) Patent No.: US 9,372,779 B2
(45) Date of Patent: Jun. 21, 2016

(54) SYSTEM, METHOD, APPARATUS AND COMPUTER PROGRAM FOR AUTOMATIC EVALUATION OF USER INTERFACES IN SOFTWARE PROGRAMS

(71) Applicant: International Business Machines Corporation, Armonk, NY (US)

(72) Inventors: Joseph W. Ligman, Wilton, CT (US); Marco Pistoia, Amawalk, NY (US); John Ponzo, Yorktown Heights, NY (US); Gegi Thomas, Piermont, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/267,963

(22) Filed: May 2, 2014

(65) Prior Publication Data

US 2015/0317234 A1   Nov. 5, 2015

(51) Int. Cl.
*G06F 11/00* (2006.01)
*G06F 11/36* (2006.01)
*G06F 11/22* (2006.01)

(52) U.S. Cl.
CPC ........ *G06F 11/3612* (2013.01); *G06F 11/2273* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 7,086,032 B2 | 8/2006 | Nirell et al. | |
| 7,568,188 B2 | 7/2009 | Fathalla | |
| 7,861,230 B2 | 12/2010 | Keljo | |
| 8,296,445 B1 | 10/2012 | Hackborn et al. | |
| 8,429,459 B2 * | 4/2013 | Birakoglu et al. | ........... 714/38.1 |
| 8,595,559 B2 * | 11/2013 | Stewart | ........................ 714/38.1 |
| 9,009,669 B2 * | 4/2015 | Pletter | ........................... 717/124 |
| 2011/0055912 A1 * | 3/2011 | Fusari | ............... G06F 17/30893 726/8 |
| 2011/0289481 A1 | 11/2011 | Franklin et al. | |
| 2013/0014085 A1 | 1/2013 | Brennan et al. | |
| 2015/0007145 A1 * | 1/2015 | Pierce | ................ G06F 11/3466 717/130 |
| 2015/0058821 A1 * | 2/2015 | White et al. | .................. 717/105 |

OTHER PUBLICATIONS http://en.wikipedia.org/wiki/Upload, accessed Feb. 7, 2013.

* cited by examiner

*Primary Examiner* — H S Sough
*Assistant Examiner* — Deric Ortiz
(74) *Attorney, Agent, or Firm* — Harrington & Smith

(57) ABSTRACT

A method includes inputting an application program to be tested to a data processing system; linking the application program to a software library; performing, in cooperation with the software library, a static analysis of a user interface of the application program, without executing the application program, to generate a set of static analysis results; performing, in cooperation with the software library, a dynamic analysis of the user interface of the application program while executing the application program to generate a set of dynamic analysis results and, based on the set of static analysis results and the set of dynamic analysis results, a step of determining if the user interface of the application program violates one or more user interface policy rules. Also disclosed is a computer program product that implements the method and a system configured to execute the computer program product in accordance with the method.

20 Claims, 5 Drawing Sheets

SYSTEM, METHOD, APPARATUS AND COMPUTER PROGRAM FOR AUTOMATIC EVALUATION OF USER INTERFACES IN SOFTWARE PROGRAMS

TECHNICAL FIELD

The various examples of the embodiments of this invention relate generally to data processing systems and computer software and, more specifically, relate to user interface (UI) design, evaluation and analysis for an application program such as one intended to be executed on a mobile platform.

BACKGROUND

Mobile application testing typically requires manual interaction by an individual with the application program (application or simply app) being tested/evaluated. As the tester performs a test case on a mobile application, the interaction and the application's response can be captured and stored for offline analysis. However this approach is limited since human error can contaminate the test results such as by not adequately testing all possible program flow paths. Furthermore this approach is inefficient since each individual test case must be manually performed.

SUMMARY

In accordance with one aspect thereof the embodiments of this invention provide a method that includes a step of inputting an application program to be tested to a data processing system; a step of linking the application program to a software library; a step of performing, in cooperation with the software library, a static analysis of a user interface of the application program, without executing the application program, to generate a set of static analysis results; a step of performing, in cooperation with the software library, a dynamic analysis of the user interface of the application program while executing the application program to generate a set of dynamic analysis results; and based on the set of static analysis results and the set of dynamic analysis results, a step of determining if the user interface of the application program violates one or more user interface policy rules.

In accordance with another aspect thereof the embodiments of this invention provide a computer program product comprised of software instructions on a computer-readable medium. Execution of the software instructions in a data processing system results in performing operations that comprise inputting an application program to be tested to the data processing system; linking the application program to a software library; performing, in cooperation with the software library, a static analysis of a user interface of the application program without executing the application program to generate a set of static analysis results; performing, in cooperation with the software library, a dynamic analysis of the user interface of the application program while executing the application program to generate a set of dynamic analysis results and, based on the set of static analysis results and the set of dynamic analysis results, determining if the user interface of the application program violates one or more user interface policy rules.

In accordance with yet another aspect thereof the embodiments of this invention provide a system comprised of at least one data processor connected with at least one memory that stores software instructions. In the system the execution of the software instructions by the at least one data processor causes the system to input an application program to be tested; link the application program to a software library; perform, in cooperation with the software library, a static analysis of a user interface of the application program without executing the application program to generate a set of static analysis results; perform, in cooperation with the software library, a dynamic analysis of the user interface of the application program while executing the application program to generate a set of dynamic analysis results and, based on the set of static analysis results and the set of dynamic analysis results, to determine if the user interface of the application program violates one or more user interface policy rules.

DETAILED DESCRIPTION

The use of embodiments of this invention enables an automatic evaluation and testing of a UI within an application. One significant advantage that is realized by the use of the invention is that no direct user interaction is required to perform the evaluation/testing.

The use of this invention enables the automatic evaluation of a UI implemented within an application and thus can have a direct impact on the application design of a native UI (native to the application) by providing an application developer with feedback in order to determine if any existing UI controls violate any predetermined application parameters.

The use of this invention also enables an injection of analytical code into an existing application to achieve the analysis directly on the native UI widgets/buttons/controls of an application, without requiring the direct involvement of a person which could otherwise potentially introduce incompleteness and errors.

The use of this invention also enables a system allowing an application tester, such as an application developer, to perform at least the following tasks on a mobile application or mobile application prototype:

(A) visually review top-level views of the mobile application as they would be presented on a screen to a user of the application; and (B) respond to alerts automatically generated for the application tester that indicate a presence of any abnormality in the views or the logical flow between the views that would violate pre-established guidelines/rules.

Figure 1:
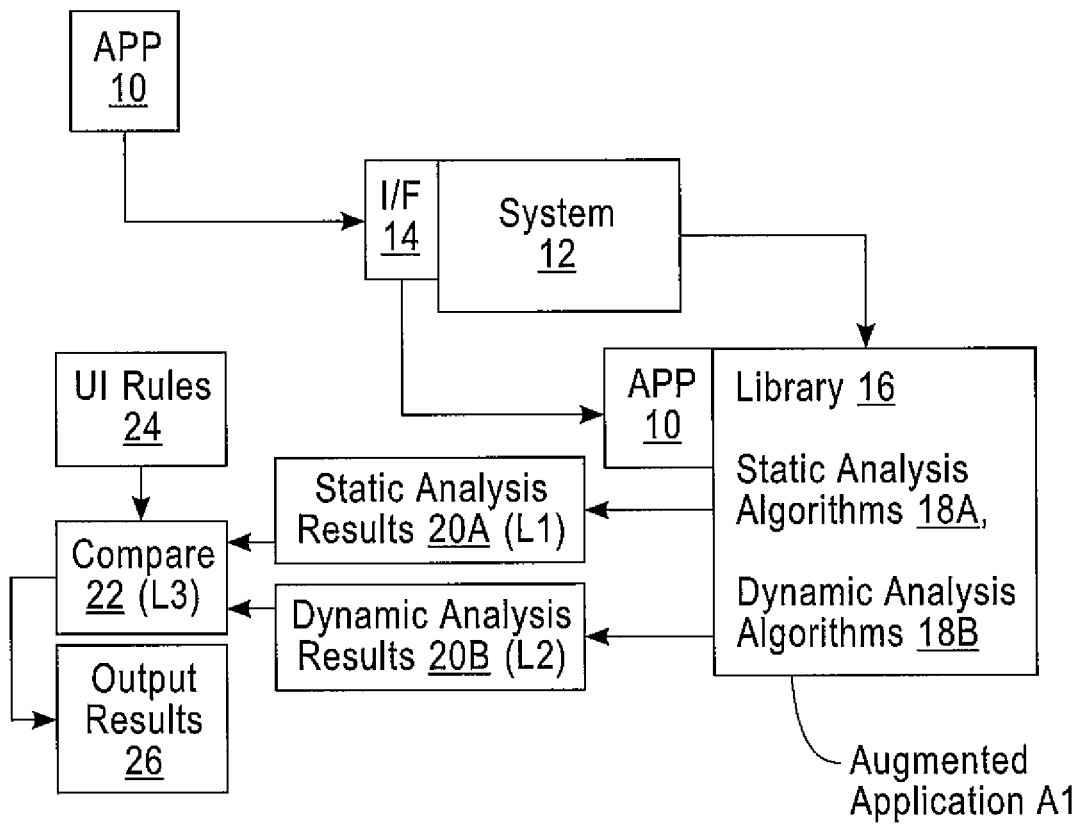
FIG. 1 is a block diagram of a system that can be used to implement the embodiments of this invention.

In operation, and referring to FIG. 1, a mobile application 10 (a completed application or a prototype application) to be tested is uploaded to a system 12 via a suitable system interface 14. The application 10 can be one written by an enterprise or organization for internal use, or it can be a third party application written for use by a particular enterprise or application, or it could be a third party application written to be published in an application store to be downloaded for use by any number of potential users. The application 10 can be one developed to be executed on a mobile platform device, such as a smart phone or a tablet, or on a PC or a workstation type device, or on any combination of types of host devices. While the invention is described below primarily in the context of the testing of mobile application (i.e., applications intended to be run on a mobile device platform) the invention is not restricted for use with mobile applications.

It can be noted that uploading the application 10 to the system 12 is but one suitable technique to make the application 10 available for testing at the system 12. In other embodiments, and by example, the system 12 could take the application 10 as input from a transmission process that could be considered as a 'peer' transmission from an application distribution system (e.g., an enterprise application store). In still other embodiments a memory device, such as a memory stick or a portable disk, that has the application 10 recorded therein could be connected to the system 12 and the application read from the memory device to a memory of the system 12.

By whatever means the application 10 is provided to the system 12 the system 12 injects a software library 16 into the uploaded application 10 and software routines of the library 16 are linked to the software of the application 10. This forms an augmented application referred to below as Application A1. An operation contained within the library 16 is executed by the system 12, resulting in the execution of analysis algorithms 18 on the application 10. The analysis algorithms include at least one or more static analysis algorithms 18A and one or more dynamic analysis algorithms 18B.

First, a static analysis is performed on the application 10, resulting in the collection of a first data set 20A that includes statically resolved top-level views, their contained controls, and their associated targeted execution flow.

Figure 2:
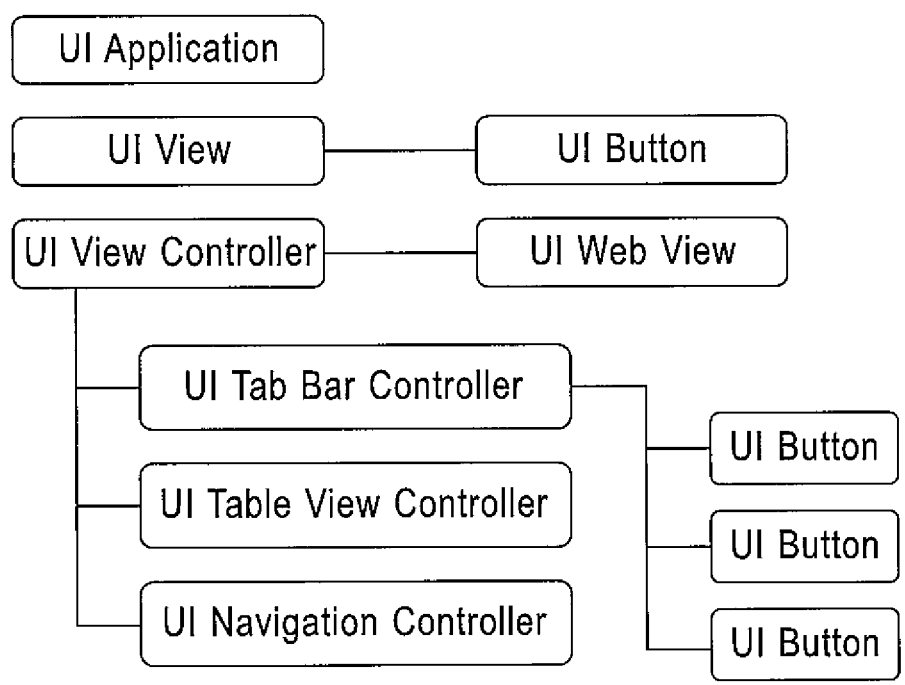
FIG. 2 illustrates an example of a representative view hierarchy.

In operation the static analysis algorithms 18 extract a view hierarchy of the application 10. A partial example of a representative view hierarchy is depicted in FIG. 2. In FIG. 2 under UI View is a UI View Controller that in turn includes three components: UI Tab Bar Controller, UI Table View Controller and UI Navigation Controller. Each of these can be considered as a software code unit or module that performs some certain UI function. Under each there will typically be at least one UI Button (three are shown by example under the UI Tab Bar Controller) by which a user of the application is enabled to exert control over the functionality of the respective UI software module.

Next a dynamic analysis is performed on the application 10, resulting in the collection of a second data set 20B that includes a collection of dynamically resolved top-level views, their contained controls, and their associated target execution paths.

Figure 3:
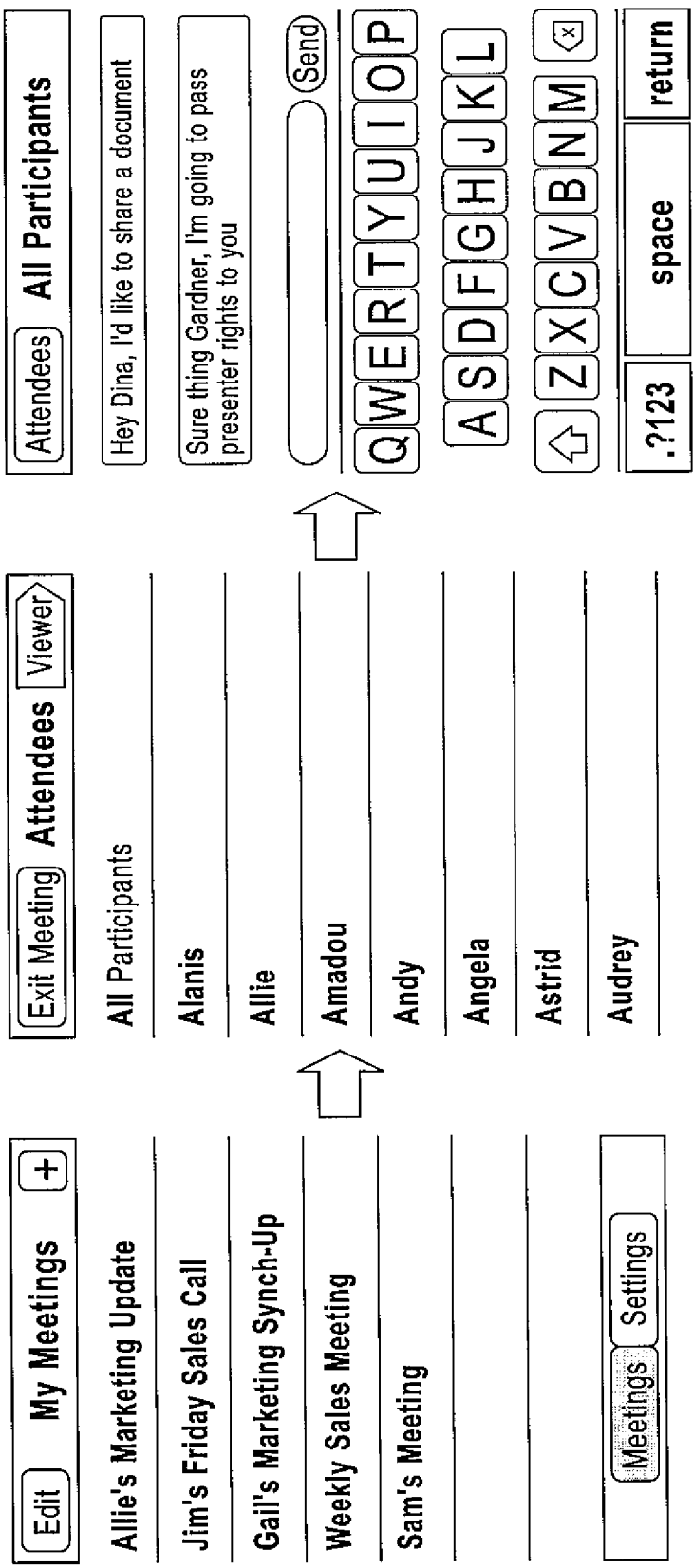
FIG. 3 shows a result of the operation of the dynamic analysis algorithms shown in FIG. 1 to capture automated running application screen views or screenshots.

In operation the dynamic analysis algorithms 18B capture automated running application screen views or screenshots, and example of which is shown in FIG. 3. In FIG. 3 the application 10 is exercised and it generates resulting screen views, three of which are shown. For example, selecting one of the meetings presented under the screen 'My Meetings' generates a second screen 'Attendees'. Selecting the 'All Participants' under 'Attendees' produces the third screen where a message can be composed to be sent to all of the participants listed under 'Attendees'. Representative simulated user data can be generated to populate the various text-containing blocks of the screens.

The dynamic analysis algorithms 18B can thus automatically simulate input data to navigate between screens and also exercise the various UI buttons associated with each screen to cause the application 10 to operate and generate output that is captured by the system 12. An analysis reconciliation process is performed to detect false negative results and false positive results.

More specifically, the results from the collected first data 20A and second data 20B are compared by a comparison function 22 such that false-positive values can be eliminated from the collected data sets. The remaining results formed from the combination of both the static and the dynamic analyses are extracted, and the results are processed for validation against a pre-established set of UI rules 24. Any detected abnormalities are cataloged and output by the system 12 as a list of detected results 26 for review by an application tester or by the application developer.

Note that in some embodiments the application tester could be person while in other embodiments the application tester could be embodied as software running on the system 12 or on another computer system.

Describing now the process and method in accordance with this invention in further detail, the application 10 is uploaded, either in source form or in binary (compiled) form, to the system 12.

Upon receipt of the application 10 the system 12 detects a presence of any 'metadata' information of the application, including (but not limited to): the Application Program Interface/Software Development Kit (API SDK) version that the application 10 supports; the date/version information of the application 10; the file type/extension and the file size and characteristics. The metadata can be extracted and be stored and is useful when analyzing the application software.

Subsequent to receipt of the application 10 and the detection of the metadata associated with the application 10, referred to now as uploaded Application A, the system 12 performs a modification to the uploaded Application A to produce the updated and augmented Application A1. The updated and augmented Application A1 contains the original application logic and also the injected additional algorithmic logic. The injected additional algorithmic logic can be application-agnostic. The additional algorithmic logic is embodied in the form of the application library 16. Algorithms, including the static analysis algorithms 18A and the dynamic analysis algorithms 18B, are precompiled within the library 16. Once the code embodied in the application library 16 is included as part of a linking stage during the creation/assembly of Application A1 the algorithms within the application library 16 are called and invoked upon the execution of the native code contained in the originally uploaded Application A. This is achieved by virtue of the application library 16 containing application initialization execution logic code that seamlessly takes precedent over the original (native) initialization execution logic code of Application A1. The application initialization execution logic code in the application library 16 is detected and invoked by a mobile platform operating system when executing Application A1. The linked software routines embodied in the library 16 thus take control over the Application A1 and characterize and exercise the Application A1.

Once the platform/version is determined the Application A is augmented with the library 16 and calls to the library 16 are weaved (injected) into the existing code of the Application A to provide the augmented Application A1. The weaving process can involve adding the library calls in the application code where there were none before. This process can differ as to whether the Application A was originally supplied in source or binary form, and what programming language(s) were used to build the Application A. This process can include known techniques such as byte code injection, application program interface (API) method swizzling, or otherwise modifying the binary and/or source code at one or more key points to alter the original flows of the Application A with the injected calls to the library 16. API method swizzling is a known procedure that can be used with Objective-C to exchange the implementation of two methods, i.e., the implementation of one method can be exchanged with an implementation of another method.

For testing purposes an applicable mobile platform operating system can be embodied at the system 12 and can be executed so as to simulate the software/hardware environment of the particular mobile platform(s) for which the Application A is intended. The modified Application A1, containing the library 16, is thus not required to be executed on or by a target mobile platform, and no results are required to be uploaded from any target mobile platform to the system 12 for analysis.

It is noted that the application initialization execution logic in library 16, as part of the execution of Application A1, in no way compromises the original functionality of Application A; rather, the application initialization execution logic in library 16 replicates the original initialization execution logic code of the Application A, while additionally adding the ability for subsequent invocations/execution paths during the lifecycle of Application A1 to be rerouted to the library 16 for algorithmic processing before returning to the original execution path.

After Application A1 is created the system 12 invokes an algorithmic process on the Application A1, referred to herein as the static analysis algorithm(s) 18A. One distinguishing feature of the static analysis algorithm 18A is that it functions without actually executing the Application A1. Instead the static analysis algorithm 18A systematically inspects all (native) components of the Application A1, including all available invocations/execution flow paths, all visually codified entities/views and their sub-view components, and all resource files. A result of the operation of the static analysis algorithm 18A when completed is the generation of an exhaustive list or collection of itemized entities relating to the UI of the Application A. This list, L1, is stored by the system 12 as the static analysis results 20A for later use.

The system 12 next invokes a second distinctive algorithmic process on Application A1 embodied as the dynamic analysis algorithm(s) 18B. In contradistinction to the static analysis algorithm 18A the dynamic analysis algorithm 18B operates by direct execution of the Application A1, which in this case is an automated (simulated) execution of the Application A1. The dynamic analysis algorithm 18B systematically executes portions of the Application A1, beginning with the initial launching of the Application A1, and continues with the subsequent execution of any controls and buttons that can be invoked by a user during the execution of the Algorithm A when it is resident on a suitable mobile platform. The buttons and controls can be determined by an analysis of the static analysis results 20A. This ability to perform automated execution of the Application A, as modified to become the Application A1, is one of the features of the algorithmic logic provided by application library 16.

The dynamic analysis algorithm 18B systematically inspects all components of the application, including all available invocations/execution flow paths, visually presented entities/views and their sub-view components, and resources used during the execution of the application. For example, every screen that is invoked is tested by algorithmically activating each button/control that is present in each screen, which can result in invoking another screen containing one or more buttons/controls, etc. The resultant hierarchy of screen images is captured, and the controls used to invoke the screen images are recorded, as part of the dynamic analysis results 20B. The hierarchy of captured screens can be subsequently presented to an application tester or the application developer for visual verification of screen correctness and order. Further by example, if a text entry box is invoked by activating a certain button then simulated user input data can be entered into the text entry box and the box then closed using another control to verify that the simulated user input data is sent intact to a designated application buffer or other designated location for the entered alphanumeric data. Further by example, if a particular text entry box has been declared to be a date box having a format mm/dd/yyyy then the dynamic analysis algorithm 18B operates to verify that only in-range numbers are accepted for entry into the date box.

The result of the dynamic analysis algorithm 18B when complete is a list L2 stored as the dynamic analysis results 20B. The list L2 represents an exhaustive collection of itemized application entities relating to the dynamic operation of the UI of the Application A.

Upon completion of both the static analysis algorithm(s) 18A and the dynamic analysis algorithm(s) 18B the system 12 proceeds to a processing stage referred to as analysis reconciliation (compare 22 in FIG. 1) where a comparison algorithm is executed on the lists L1 and L2. Each of the application entities within both lists are compared and categorized. The comparison results in filtering out imprecision in the reports produced by the analysis, for example "false positives". A false positive in the static analysis occurs when the static analysis reports a result that is infeasible at run time. In this case, for example, the static analysis results 20A contain an entity but there is no dynamic analysis result 20B to corroborate the entity. Conversely, a particular screen image/view may be invoked and recorded but is not declared in the static analysis results 20A. This would be a false negative for the static analysis 20B, and it would occur because not all the views can be created without executing the code, particularly those views that are generated based on dynamic input provided by the user at run time. Also by example, the static analysis results 20A may indicate that some number n of static image views/components have been declared and it can thus be expected that the dynamic analysis results 20B show that all of the n static image views/components were invoked at least once.

The resulting list L3 is then compared against the predetermined list of UI policy violations and rules 24 pre-established for the application. The policy violation rules 24 can range from widely accepted industry standard UI guidelines to organization-specific UI rules. The policy violation rules 24 can be language-specific and/or country-specific. The list of UI policy violation rules 24 is in a form that is tractable for comparison to L3.

Figure 4:
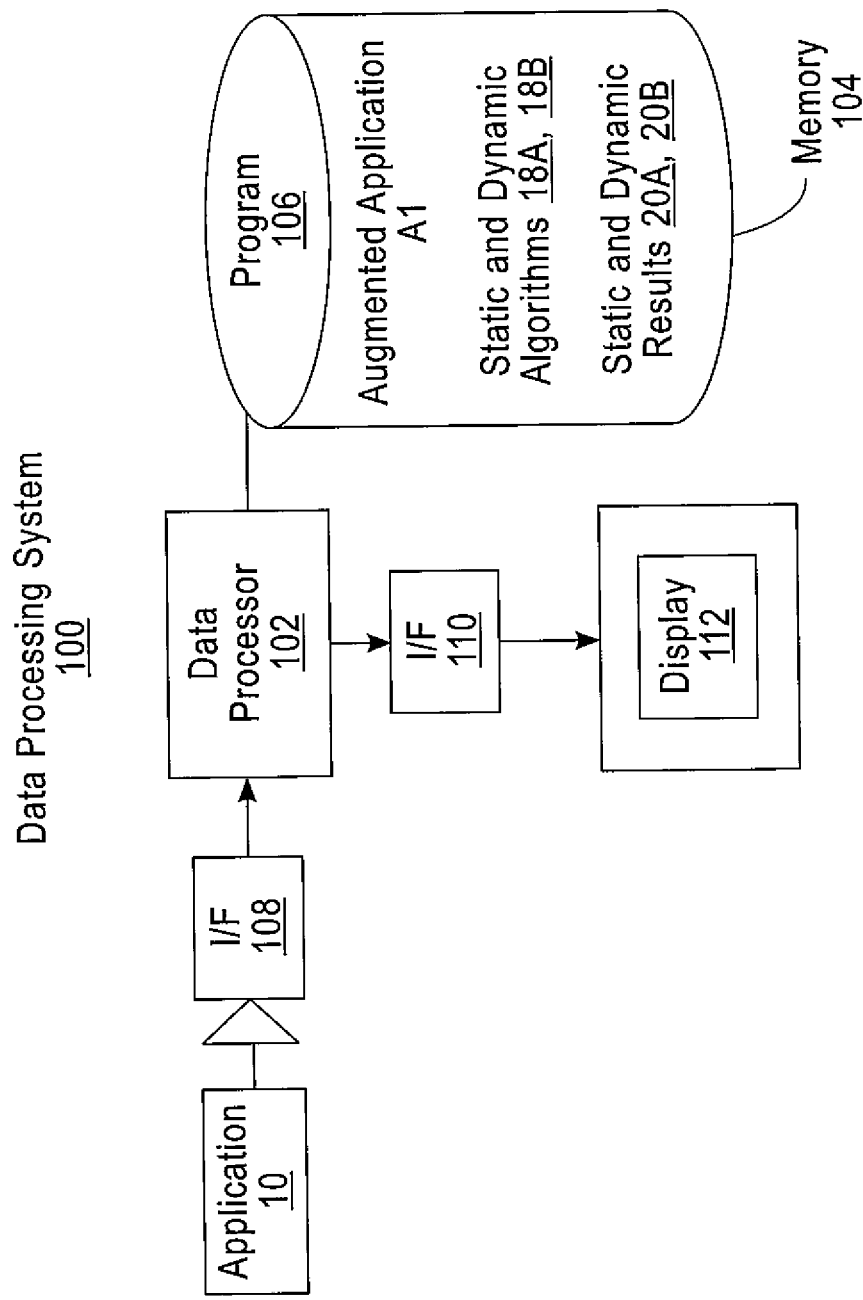
FIG. 4 shows an example of a data processing system that can be used to embody one or more of the components of the system shown in FIG. 1.

FIG. 4 shows an example of a data processing system 100 that can be used to embody one or more of the components of the system 12 shown in FIG. 1. For example, the data processing system 100 includes at least one data processor 102 connected with at least one computer-readable medium such as a memory 104 that stores a program 106 configured to perform the augmentation of the received application 10 and execute the static analysis algorithms 18A, the dynamic analysis algorithms 18B, the comparison algorithm 22 and report the results 26 as described above. The memory 104 is also configured to store the static analysis results 20A and the dynamic analysis results 20B including the hierarchy of screen images that result from the execution of the dynamic analysis algorithms 18B. The data processing system 100 further includes a first interface (I/F) 108 (shown in FIG. 1 as the interface 14) that is configured to receive the application 10 from some application source (e.g., a third party application developer or an internal, enterprise-associated application developer) and a second interface 110 configured to output results data to a user of the system 100 via any suitable system user interface that includes a display 112. The user can, for example, review the stored hierarchy of screen images that result from the execution of the dynamic analysis algorithms 18B. The interfaces 108 and 110 can each be directly or indirectly connected to an associated network that can be embodied as a wired network or as a wireless network.

In some embodiments the data processing system 100 can be physically located and instantiated at an enterprise, while in some other embodiments some or all of the data processing system 100 can be a virtual system hosted in the cloud either by the enterprise itself or by a third party cloud provider.

Figure 5:
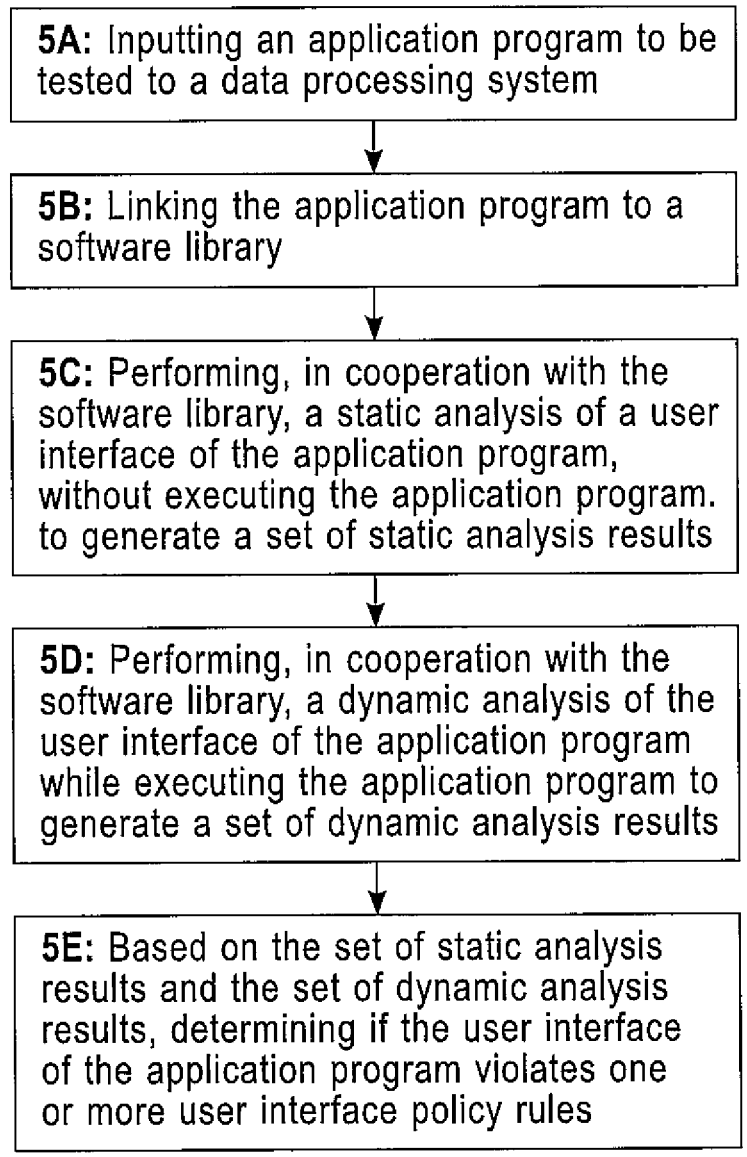
FIG. 5 is a logic flow diagram and flow chart that is descriptive of the execution of a method, and a result of execution of computer program code, in accordance with the embodiments of this invention.

FIG. 5 is a logic flow diagram that is descriptive of the execution of a method, and a result of execution of computer program code such as program code hosted by the data processing system 100, in accordance with the embodiments of this invention.

At Block 5A there is a step of inputting an application program to be tested to a data processing system. At Block 5B there is a step of linking the application program to a software library. At Block 5C there is a step of performing, in cooperation with the software library, a static analysis of a user interface of the application program, without executing the application program, to generate a set of static analysis results. At Block 5D there is a step of performing, in cooperation with the software library, a dynamic analysis of the user interface of the application program while executing the application program to generate a set of dynamic analysis results. At Block 5E there is a step performed, based on the set of static analysis results and the set of dynamic analysis results, of determining if the user interface of the application program violates one or more user interface policy rules.

As was noted above the embodiments of this invention do not require the instantiation of a process on a mobile device or mobile platform. Instead the system 12 takes as input the mobile application 10, executes analysis processes on the application, processes the differing results achieved through the analysis and validates the results against pre-established metrics.

The embodiments of this invention do not require that the system 12 intercept and substitute values during the execution of the mobile application 10. Instead the system 12 obtains the first stage of analysis results (the static analysis results 20A) without executing the Application A, and can obtain the second stage of analysis results (the dynamic analysis results 20B) by recording results during the execution of the augmented Application A1.

The embodiments of this invention do not require or rely on any source/target 'shims' to intercommunicate and step through interlaced analysis operations. The system 12 leverages the dynamic binding of the library 16 to the existing uploaded application 10, which does not modify the UI behavior of the mobile application under evaluation. The system 10 performs two distinct analytical operations on the mobile application 10, i.e., the "static" and "dynamic" analysis process phases, and produces a reconciled evaluation as a result. Furthermore, the results are compared to a predetermined set of established UI parameters, resulting in the creation of a problem-list of issues contained within the UI of the application 10.

The embodiments of this invention do not require recording any interactions of a user that would serve to compose a structure of actions. Instead, the system 12 analyzes the UI of the uploaded application 10 statically with no actionable input, and then dynamically with the algorithm 18B that attempts to iterate through all potential user execution paths within the mobile application 10. The results of the analysis are not linked to any action that a user has taken; rather, the reconciled analytical results are compared with a set of pre-established metrics, whereby a presence of any problems within the UI of the mobile application can be determined.

The embodiments of this invention dynamically link the analytical library 16 to the uploaded mobile application in a non-invasive manner without requiring any changes or alterations to the original, native code of the application 10.

The embodiments of this invention, during the dynamic analysis phase, automate the execution of the mobile application 10 without a user's directed input in an effort in order to obtain all of the potential UI objects that the application 10 could potentially present to a random user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As such, various modifications and adaptations may become apparent to those skilled in the relevant arts in view of the foregoing description, when read in conjunction with the accompanying drawings and the appended claims. As but a few examples it should be clear that similar or equivalent hardware embodiments, metadata and/or programming languages may be used by those skilled in the art. However, all such and similar modifications of the teachings of this invention will still fall within the scope of this invention.

What is claimed is:

1. A method, comprising:
inputting an application program to be tested to a data processing system;
creating an augmented application program by injecting, into native application logic of the application program, additional application logic that comprises a software library comprising analysis algorithms configured to analyze a user interface of the application program, the analysis algorithms comprising static analysis algorithms and dynamic analysis algorithms, where creating the augmented application program further comprises injecting calls to the analysis algorithms into the native application logic of the application program;
performing, in co operation with the additional application logic and with calls made to the analysis algorithms in the software library, a static analysis of the user interface of the application program without executing the application program to generate a set of static analysis results;
performing, in cooperation with the additional application logic and with calls made to the analysis algorithms in the software library, a dynamic analysis of the user interface of the application program while executing the application program to generate a set of dynamic analysis results; and based on the set of static analysis results and the set of dynamic analysis results, determining if the user interface of the application program violates one or more user interface policy rules.

2. The method as in claim 1, where the step of determining comprises an initial step of reconciling the set of static analysis results and the set of dynamic analysis results.

3. The method as in claim 1, where the step of inputting the application program includes a step of determining a presence of meta-data information of the application program.

4. The method of claim 3, where determining the presence of metadata determines a presence of at least one of an Application Program Interface/Software Development Kit (API SDK) version supported by the application program, date/version information of the application program, and a file type/extension and file size and characteristics of the application program.

5. The method of claim 1, where the step of performing the static analysis systematically inspects components of the application program.

6. The method of claim 5, where the components comprise at least one of available invocations/execution flow paths, visually codified entities/views and their sub-view components, and resource files.

7. The method of claim 1, where the step of performing the dynamic analysis comprises systematically and automatically executing the application program beginning with an initial launching of the application program, activating any user interface controls and buttons that can be invoked by a user during the execution of the application program and recording a result of the activation.

8. The method as in claim 7, further comprising recording any screens that are invoked during the systematic execution of the application program, where the recorded screens are displayable to a user of the system to visually verify the correctness and order of presentation of the screens.

9. The method of claim 1, where the application is a mobile application intended to be executed in a mobile device platform under control of an operating system of the mobile device platform.

10. A computer program product comprised of software instructions on a non-transitory computer-readable medium, where execution of the software instructions in a data processing system results in performing operations comprising:
inputting an application program to be tested to the data processing system;
creating an augmented application program by injecting, into native application logic of the application program, additional application logic that comprises a software library comprising analysis algorithms configured to analyze a user interface of the application program, the analysis algorithms comprising static analysis algorithms and dynamic analysis algorithms, where creatine the augmented application program further comprises injecting calls to the analysis algorithms into the native application logic of the application program;
performing, in cooperation with the additional application logic and with calls made to the analysis algorithms in the software library, a static analysis of the user interface of the application program without executing the application program to generate a set of static analysis results;
performing, in cooperation with the additional application logic and with calls made to the analysis algorithms in the software library, a dynamic analysis of the user interface of the application program while executing the application program to generate a set of dynamic analysis results; and based on the set of static analysis results and the set of dynamic analysis results, determining if the user interface of the application program violates one or more user interface policy rules.

11. The computer program product as in claim 10, where determining comprises reconciling the set of static analysis results and the set of dynamic analysis results.

12. The computer program product as in claim 10, where inputting the application program includes determining a presence of meta-data information of the application program.

13. The computer program product as in claim 12, where determining the presence of metadata determines a presence of at least one of an Application Program Interface/Software Development Kit (API SDK) version supported by the application program, date/version information of the application program, and a file type/extension and file size and characteristics of the application program.

14. The computer program product as in claim 10, where performing the static analysis systematically inspects components of the application program.

15. The computer program product as in claim 14, where the components comprise at least one of available invocations/execution flow paths, visually codified entities/views and their sub-view components, and resource files.

16. The computer program product as in claim 10, where performing the dynamic analysis comprises systematically and automatically executing the application program beginning with an initial launching of the application program, activating any user interface controls and buttons that can be invoked by a user during the execution of the application program and recording a result of the activation.

17. The computer program product as in claim 16, further comprising recording any screens that are invoked during the systematic execution of the application program, where the recorded screens are displayable to a user of the data processing system to visually verify the correctness and order of presentation of the screens.

18. The computer program product as in claim 10, where the application is a mobile application intended to be executed in a mobile device platform under control of an operating system of the mobile device platform.

19. A system, comprised of at least one data processor connected with at least one memory that stores software instructions, where execution of the software instructions by the at least one data processor causes the system to:
input an application program to be tested;
create an augmented application program by injecting, into native application logic of the application program, additional application logic that comprises a software library comprising analysis algorithms configured to analyze a user interface of the application program, the analysis algorithms comprising static analysis algorithms and dynamic analysis algorithms, where the created augmented application program comprises calls to the analysis algorithms that are injected into the native application logic of the application program;
perform, in cooperation with the additional application logic and with calls made to the analysis algorithms in the software library, a static analysis of the user interface of the application program without executing the application program to generate a set of static analysis results;
perform, in cooperation with the additional application logic and with calls made to the analysis algorithms in the software library, a dynamic analysis of the user interface of the application program while executing the application program to generate a set of dynamic analysis results; and based on the set of static analysis results and the set of dynamic analysis results, to determine if the user interface of the application program violates one or more user interface policy rules.

20. The system of claim 19, where performing the static analysis systematically inspects components of the application program, where the components comprise at least one of available invocations/execution flow paths, visually codified entities/views and their sub-view components, and resource files, where performing the dynamic analysis comprises systematically and automatically executing the application program beginning with an initial launching of the application program, activating any user interface controls and buttons that can be invoked by a user during the execution of the application program and recording a result of the activation, and where recording a result of the activation records any screens that are invoked during the systematic execution of the application program, where the recorded screens are displayable to a user of the system to visually verify the correctness and order of presentation of the screens.

* * * * *